United States Patent [19]

Warner

[11] 3,946,145

[45] Mar. 23, 1976

[54] TERMINATED WIRES AND METHOD OF MAKING THE SAME

[76] Inventor: Samuel Warner, 1233 St. George St., West, Linden, N.J. 07036

[22] Filed: Dec. 10, 1973

[21] Appl. No.: 423,293

Related U.S. Application Data

[62] Division of Ser. No. 290,244, Sept. 19, 1972, Pat. No. 3,793,503.

[52] U.S. Cl. ............ 174/94 R; 29/628; 29/203 DT; 219/103; 174/84 R

[51] Int. Cl.$^2$ ........................................ H02G 15/08

[58] Field of Search .............. 174/84 R, 84 C, 94 R; 219/92, 93, 103; 29/203 D, 203 DT, 628, 630 F, 470.1, 517

[56] References Cited

UNITED STATES PATENTS

| | | | |
|---|---|---|---|
| 1,959,150 | 5/1934 | Basch et al. | 174/74 X |
| 2,250,156 | 7/1941 | Ferguson | 174/84 R X |
| 2,288,348 | 6/1942 | Funk | 219/92 X |
| 3,231,964 | 2/1966 | Bennett | 29/628 |
| 3,441,707 | 4/1969 | Warner | 219/103 |

*Primary Examiner*—Darrell L. Clay

[57] ABSTRACT

A system for electrically terminating two or more insulated or uninsulated wires comprising forming a terminal about the wires with a ram and die cavity such that the terminal and wire configuration cross sectional profile is elongated in one direction, withdrawing the ram and die and engaging the terminal with a pair of electrodes to fuse the same under pressure and heat such that the terminal and wire configuration cross sectional profile becomes elongated in a direction generally perpendicular to said first direction.

6 Claims, 22 Drawing Figures

Fig. 2.
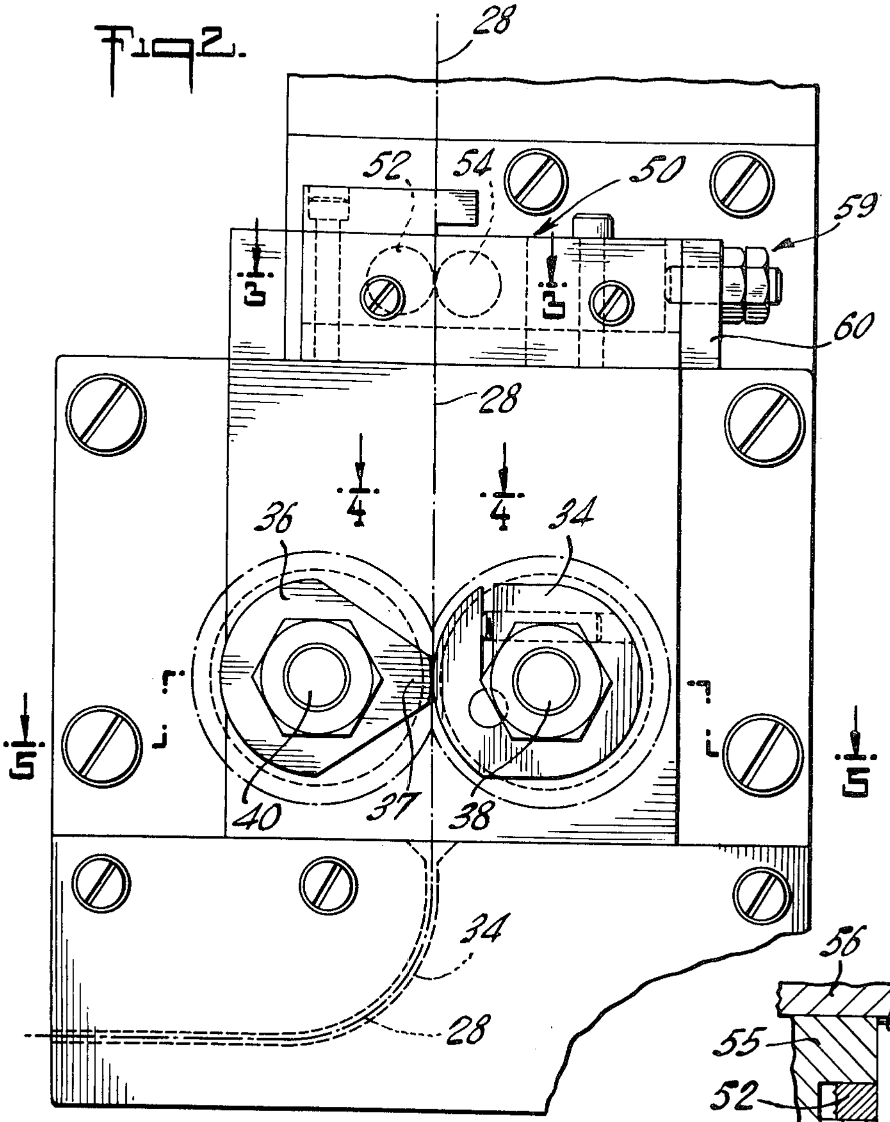
Fig. 4.
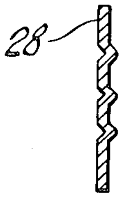
Fig. 3.
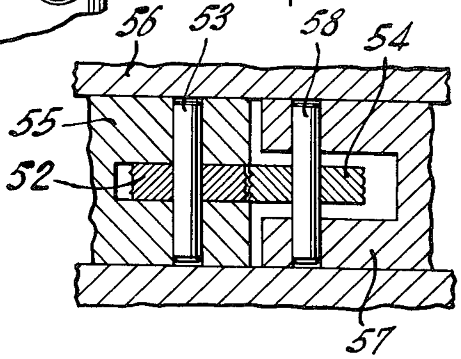
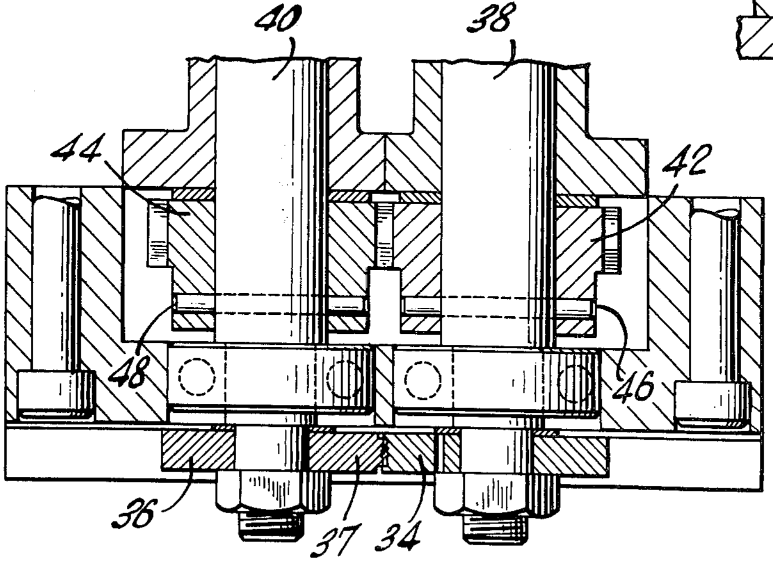
Fig. 5.

TERMINATED WIRES AND METHOD OF MAKING THE SAME

RELATED APPLICATION

This is a divisional application of Ser. No. 290,244, filed Sept. 19, 1972, now U.S. Pat. No. 3,793,503.

BACKGROUND

The present invention relates to forming lead wire terminations and more particularly to a method and apparatus for forming a terminal around lead wires which are to be connected and then fusing the terminal and the wires together.

Various techniques have long been known for forming lead wire terminations. There has developed recently great interest in the use of mechanical connectors (crimp connectors) that cut through lead wire insulation sufficiently to make electrical contact with the conductor. Since the crimp requires application of extremely high pressure, this type connector has been restricted to use with copper or other high strength wire of such diameter to withstand the inherent shearing forces resulting during crimping. Efforts are being made to develop complex pressure control systems to extend the crimp connector use to including soft materials, such as aluminum and its alloys. Another approach is disclosed in U.S. Pat. No. 3,636,611, in which the terminal is crimped under extreme pressure within the confines of a die cavity.

However, a wide variety of technical problems remain to be solved when using mechanical crimping techniques. Since the connection is made by cold crimping metals, all parts remain within their elastic limits so that the terminal, upon application of heat or current, tends to withdraw to its original condition. If the heating of parts is cyclical there is a tendency for the contacting surfaces to separate, thus undermining the electrical and mechanical properties of the connection. Furthermore, in joining magnet wire the orientation or location of the wires within the clip must be precise or severing or mechanical weakening of the smaller wires can result. Specifically, when a large or high strength wire is to be connected to a smaller or soft wire, the heavier wire must be located at the bottom of the clip. This requirement reduces production time and introduces chance of human error.

Another common approach to forming terminations for lead wire includes the hot fusion process of enclosing insulated or bare lead wire within a tube-like terminal clip and engaging the same with a pair of active high resistance electrodes to soften the parts and bond the engaging surfaces by adhesion. A machine employing this principle is disclosed in U.S. Pat. No. 3,441,707. This apparatus and its procedure of forming and fusing the clip are not free from problems. Because one of the electrodes comprises the clip support, the adjacent components must be made of non-conducting (phenolic or ceramic) material. Movement of the electrode and clip forming devices into and out of the work zone may chip or wear the edges thereof causing maintenance problems and possibly interference with the electrical connection. Also, the action to form the clip is complex requiring several strokes to fold the free ends into a tubular shape around the lead wires and the machine is limited to front insertion of wires and cannot make an "opposed" connection.

SUMMARY OF INVENTION

It is a primary object of the present invention to provide a new and improved terminal fusing machine that solves the foregoing problems and avoids the above disadvantages in the art. Furthermore, it is an object of the present invention to provide a new method of fusing a wire terminal and enclosed leads so as to enhance the electrical and mechanical properties of the termination.

Briefly, the machine according to present invention includes an upper assembly that forms a severed piece of stock material into a U-shaped terminal by means of a pair of apposed guides and a central ram carries the terminal down onto two or more wires placed in alignment with a die cavity. The ram drives the terminal home into the die cavity which turns the free legs of the terminal inward and upward to enclose the lead wires.

Thereafter, in accordance with one aspect of the invention, the upper assembly withdraws upward and the die plate bearing the die cavity withdraws downward leaving the terminal and enclosed wires in free space. A pair of opposed electrodes, aligned in a direction preferably perpendicular to the axis of the upper assembly, move into the space previously occupied by the die cavity to fuse the terminal on application of current, heat, and pressure. Thereafter, the electrodes withdraw and the die plate returns to its zero or ready position.

According to another aspect of the invention the terminal and lead wire configuration after the terminal is formed about the lead wires is elongated in profile in the direction extending toward the opposed pair of electrodes. Accordingly, when the electrodes come together about the terminal and lead wires, then heated to their plastic state, are pressed so that the respective surfaces contact as much as possible and the terminal and lead wire configuration profile elongates in a direction perpendicular to the initial profile elongation. Furthermore, the electrodes are provided with spaced portions to permit a small amount of terminal material to flow outward from the aligned direction of the electrodes, thereby providing a greater pressure to the surfaces being fused.

Another aspect of the invention is that the dimension of the electrode surface that contacts the terminal is smaller than the aligned terminal dimension, thereby permitting the end of the terminal to flare.

A further aspect of the invention is the provision of concentrated heat zones on the inside face of the terminal at the time the fusing current is first applied. The zones are created by ridges grooved into the face of the ribbon stock forming the terminal material, which ribbons serve to enhance flashing or burning of wire insulation. The ridges also penetrate the surface of the lead wires during the application of pressure and heating of the wires to their plastic state. Upon cooling, the female grooves in the lead wires and male ridges as described serve to enhance the mechanical integrity of the joint.

Other and further objects of the present invention will become apparent with the following detailed description of the invention taken in view of the appended drawings in which:

FIG. 2 is an enlarged fragmentary view of a portion of FIG. 1 depicting the stock serration wheel and drive mechanism;

FIG. 3 is an enlarged sectional view taken along the line 3—3 of FIG. 2 depicting the serrating wheels;

FIG. 4 is an enlarged section along line 4—4 depicting the stock in section;

FIG. 5 is a sectional view along line 5—5 of FIG. 2 showing the stock drive mechanism;

DETAILED DESCRIPTION

Figure 1:
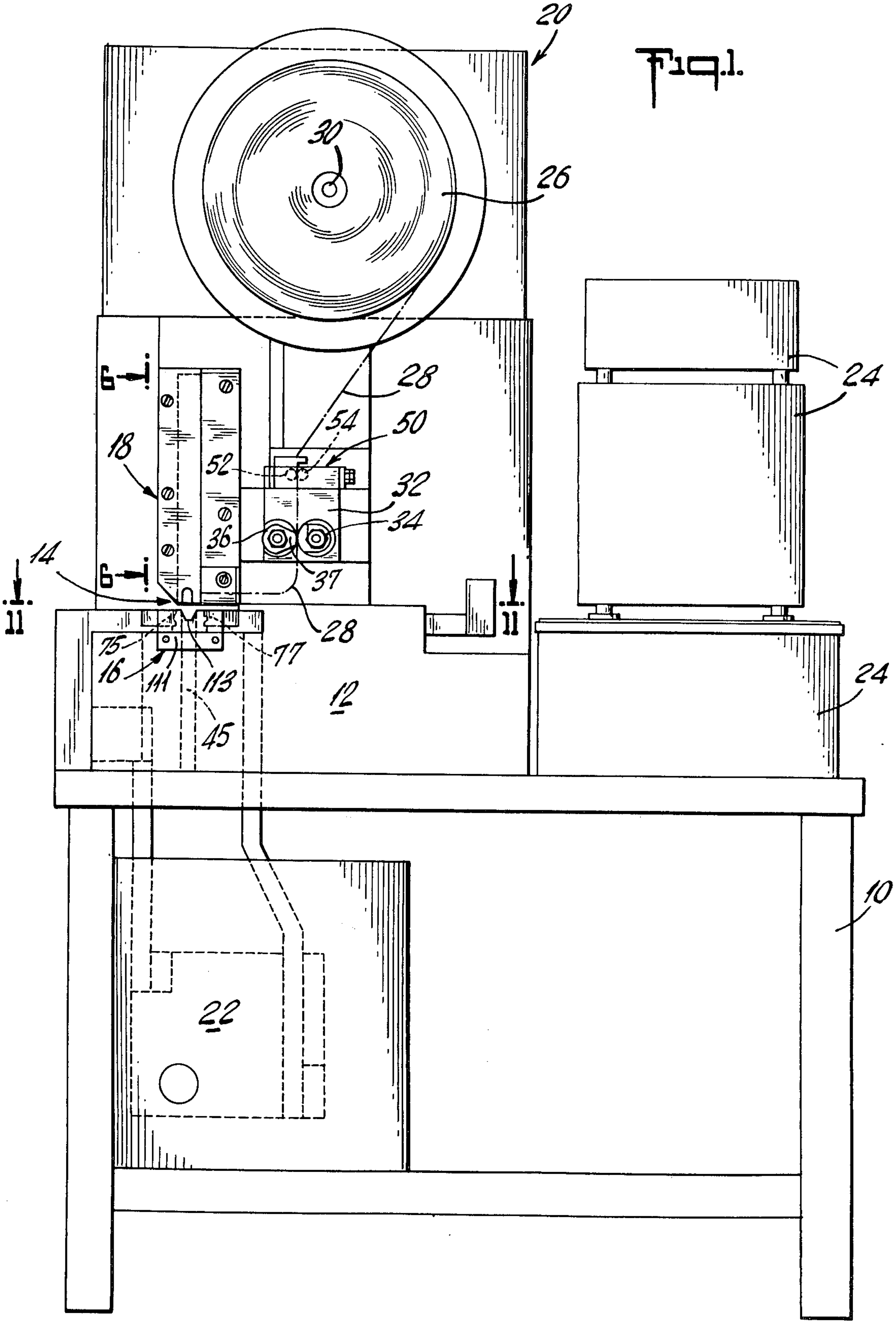
FIG. 1 is the front elevation view of a terminal machine according to the invention.

With reference to FIG. 1 terminal fusing machine, according to the invention comprises a stationary support frame 10 mounting a terminal forming and fusing assembly 12 having a terminal forming and fusing station generally indicated at 14 formed by the lower terminal guide and electrode assembly 16 and an upper terminal forming and ram assembly 18. Frame 10 also carries the mechanical drive and gear box mechanism generally indicated as 20 and the electrode power circuits 22. Timing control circuits 24 are also provided to control application of the fusing current in time relation with the movement of various parts as further described below. Further circuits may be provided at 24 that automatically test for the quality of the electrical connection made at the fusing station 14 and to generate a reject alarm for any termination that fails to meet predetermined standards. The mechanical drive and gearing arrangement 20 (which may be driven by an electric motor and flywheel), the power circuits 22 and the control circuits 24 are known in the art or may be configured without the use of invention and further description thereof is not considered necessary for a full understanding of the present invention.

Also supported on frame 10 is a rotating reel 26 of stock ribbon made of copper steel alloy or other suitable material for forming into and functioning as a lead terminal. Disc 26 is mounted for rotation at axle 30 that is supported ultimately to fixed frame 10. Ribbon 28 is fed by a stock feed assembly 32 through a stock guide channel 34 which communicates with the upper assembly 18 as further described below.

In operation, an operator places two or more insulated and/or uninsulated leads intended to be joined in an electrical termination into the terminal forming and fusing station 14 and operates a foot pedal or other suitable mechanism to activate the control circuits to initiate the terminal forming and fusing operation. Upon actuation, the upper assembly 18 shears a predetermined length of stock from the exposed end thereof extending into the assembly 18 and forms a U-shaped staple or clip facing towards the bottom assembly 16. Assembly 18 carries the clip toward bottom assembly 18 where the legs of the clip engage a die plate that turns them inward about the leads. Once the clip is closed in a staple shape about the leads, the ram mechanism of assembly 18 and die plate of assembly 16 withdraw from the terminal forming station 14 leaving the terminal and enclosed leads in free space for engagement by a pair of opposed electrodes in assembly 16 to fuse the terminal and lead assembly under controlled pressure and temperature conditions. The leads may be insulated or uninsulated, solid or stranded wire as desired inasmuch as the fusing operation by the electrodes will burn away the insulation to enhance the electrical integrity of the connection. Furthermore, fusion of the terminal parts by the electrodes causes the various parts to lose metallic memory so that deterioration of the mechanical properties of the termination does not evolve. Further description of the benefits and advantages of fusing electrical terminals, in general, appear in "Commutator Fusing" by Allan Warner, I.E.E.E., Pub. No. 69C 33-EI, Paper No. 71C38 EI-34, Sept. 20, 1971.

After the fusion step is completed the electrodes in assembly 16 withdraw and the stock feed assembly 32 feeds a predetermined length of ribbon 28 into the upper assembly 18. The operator removes the completed terminal, releases the foot pedal, and the apparatus is ready for the next termination.

With reference to FIGS. 2 through 5, the stock drive assembly 32 comprises a pair of stock drive wheels 34 and 36 each mounted to a respective drive shaft 38 and 40. A pair of pinion gears 42 and 44 are provided each respectively held to drive shafts 38 and 40 by pins 46 and 48. Shaft 38 is mechanically coupled by any suitable means (not shown) to the mechanical drive and gearing assembly 20 such that shaft 38 is rotated through 360 degrees in the counter-clockwise direction when viewed in FIG. 2. Simultaneously therewith gears 42 and 40 rotate shaft 40 and drivewheel 36 in a clockwise direction as seen in FIG. 2 and also through one complete revolution. Wheels 34 and 36 are shaped so that they both engage stock 28 therebetween for advancing the same only when and for a duration determined by the length of arc 37 on drive wheel 36. The length of this arc 37 is generally equal to the amount of stock intended to be fed through guide channel 34 into assembly 18 and the start of stock feed is dependent upon the relative angular settings or relationship between wheels 34 and 36.

A stock serration assembly 50 is provided just ahead of the drive wheels 34 and 36 and serves to impart rounded ridges or serrations within the plane of stock generally indicated as in FIG. 4. Assembly 50 comprises a pair of continuous serration imparting rollers 52 and 54 contiguously oriented in a plane perpendicular to the plane of ribbon 28. Roller 52 is rotatably mounted on pin 53 secured in block 55. Block 55 is seated within housing 56 better seen in FIG. 3. Also seated within housing 56 is block 57 securing pin 58 acting as an axis for roller 54. Block 57 is pressed against the stock in alignment with roller 52 to a pressure pre-determined by the setting of the pressure bolt assembly 59 pressing against wall 60 which is fixed relative to housing 56.

The stock material can comprise any suitable material such as copper, rich brass, stainless steel or nickel alloy. One example of a width for stock 28 is 0.150 inches.

Figure 6:
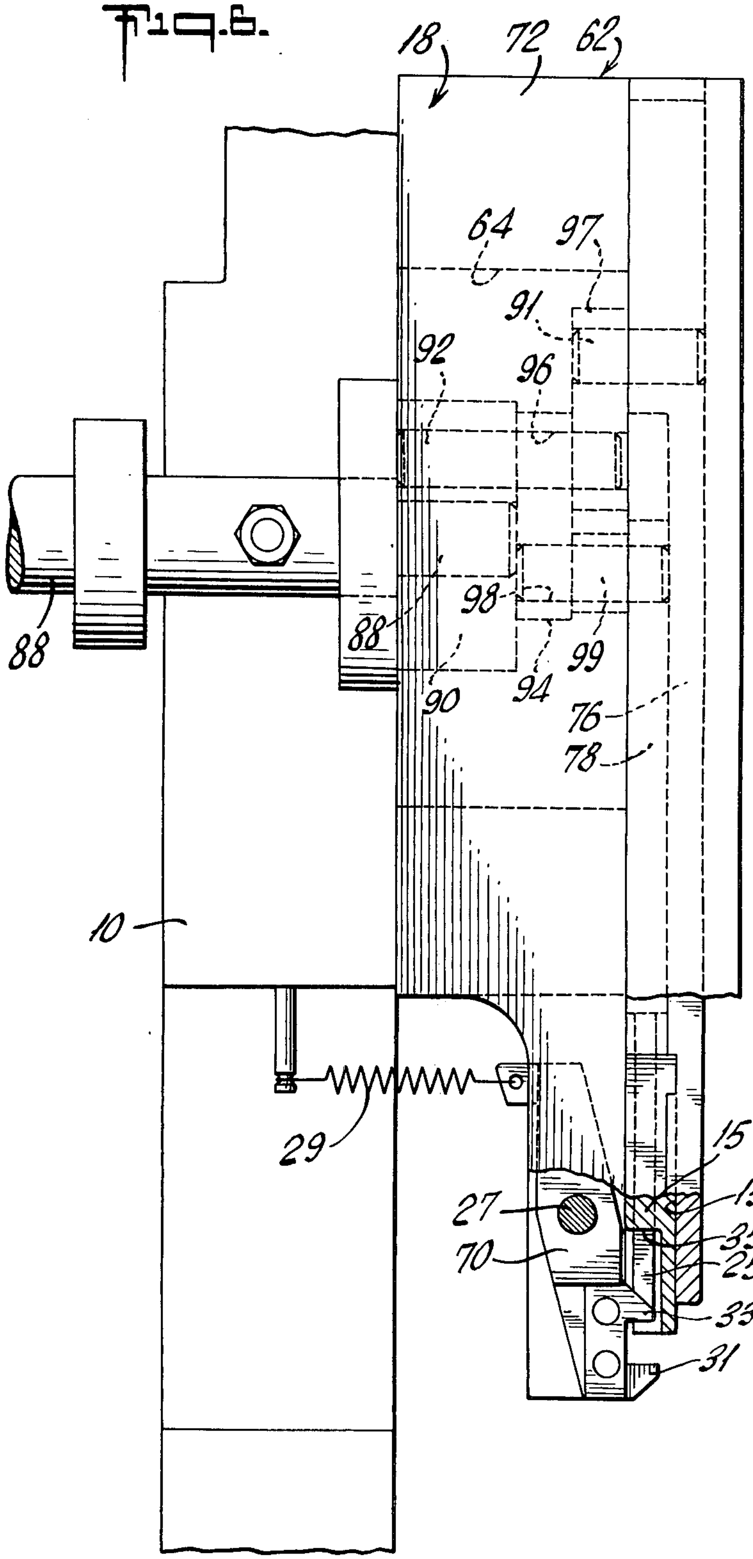
FIG. 6 is a side elevational view along line 6-6 of FIG. 1 with parts enlarged and in section.
Figure 7:
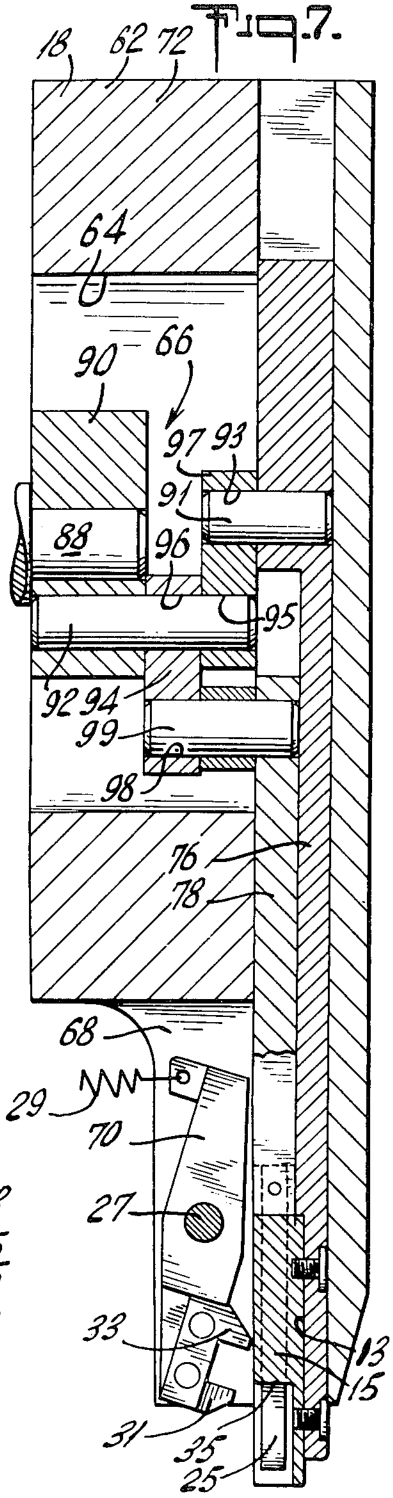
FIG. 7 is a longitudinal sectional view similar to FIG. 6, with various parts in moved positions.
Figure 7A:
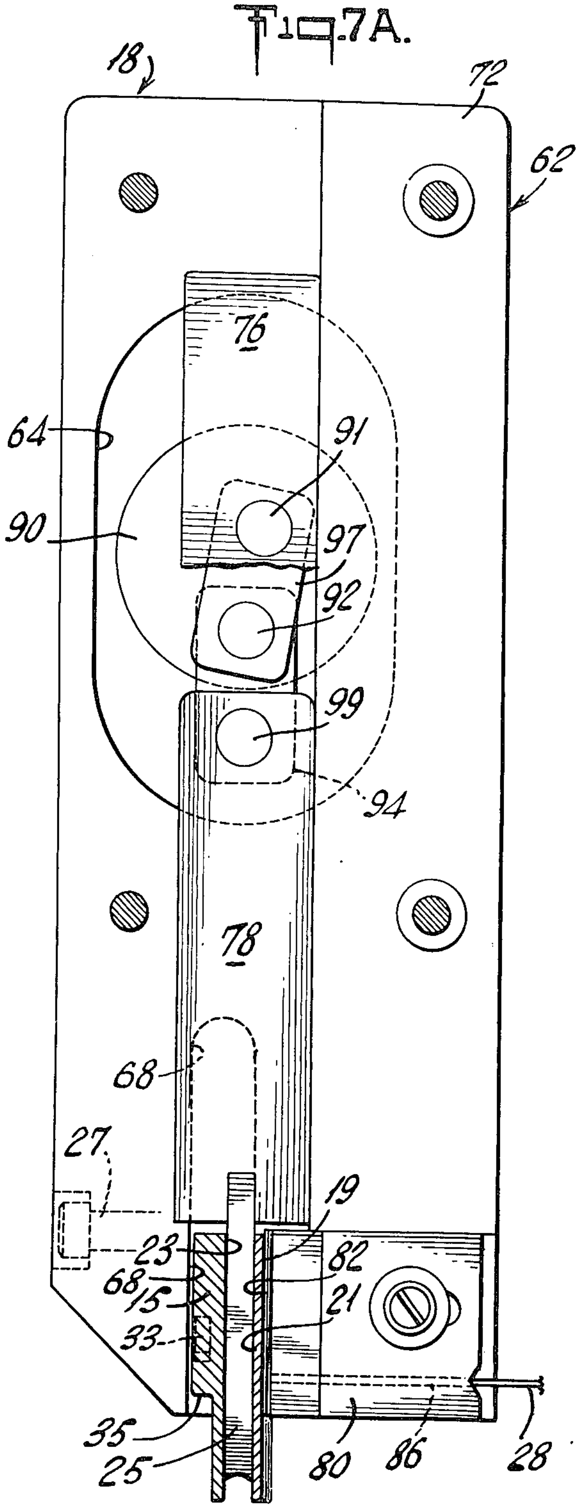
FIG. 7A is a front elevation view of FIG. 7.
Figure 8:
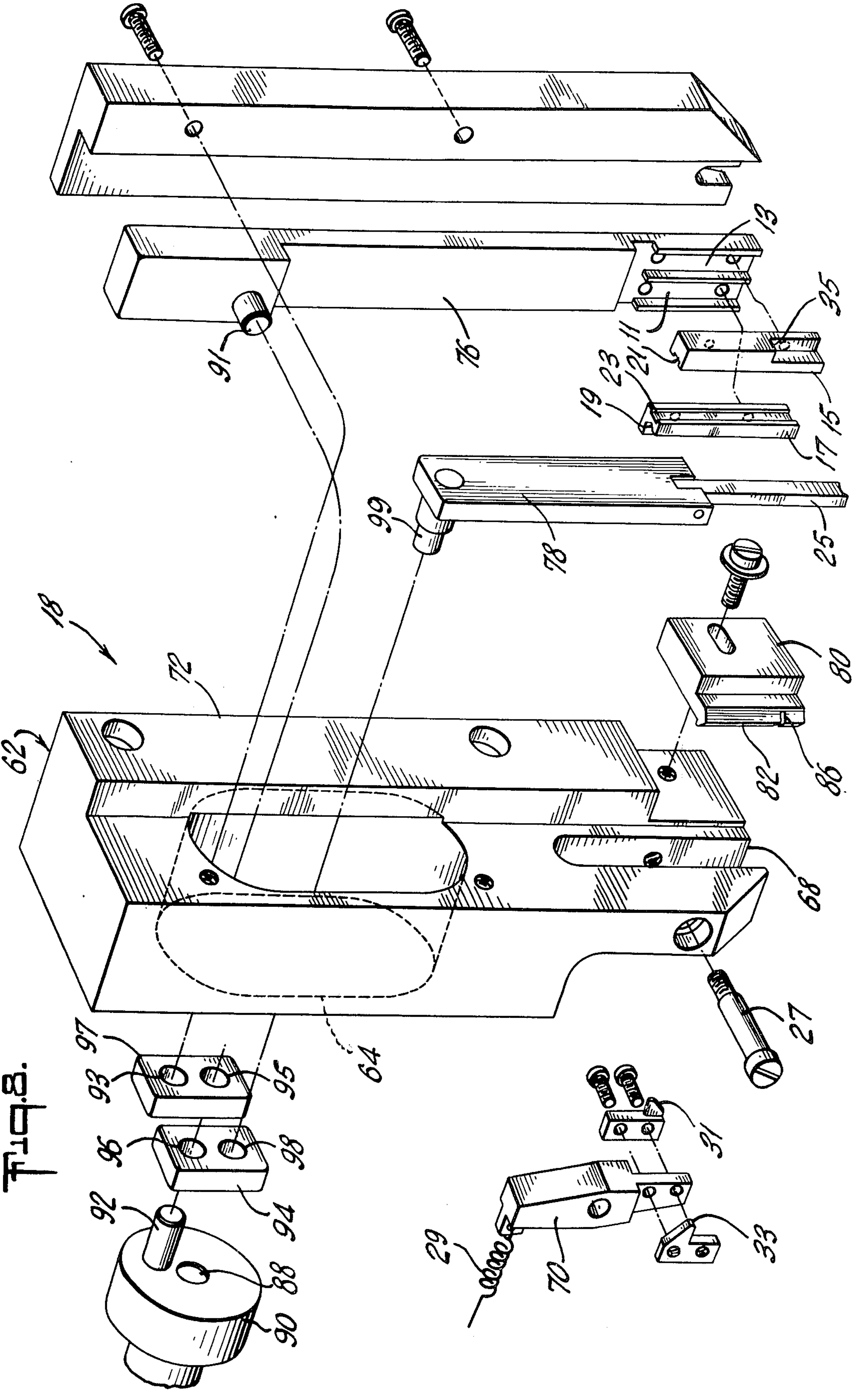
FIG. 8 is an exploded perspective view of parts shown in FIGS. 6 and 7 with certain parts rotated 90° for clarity of illustration.
Figure 9:
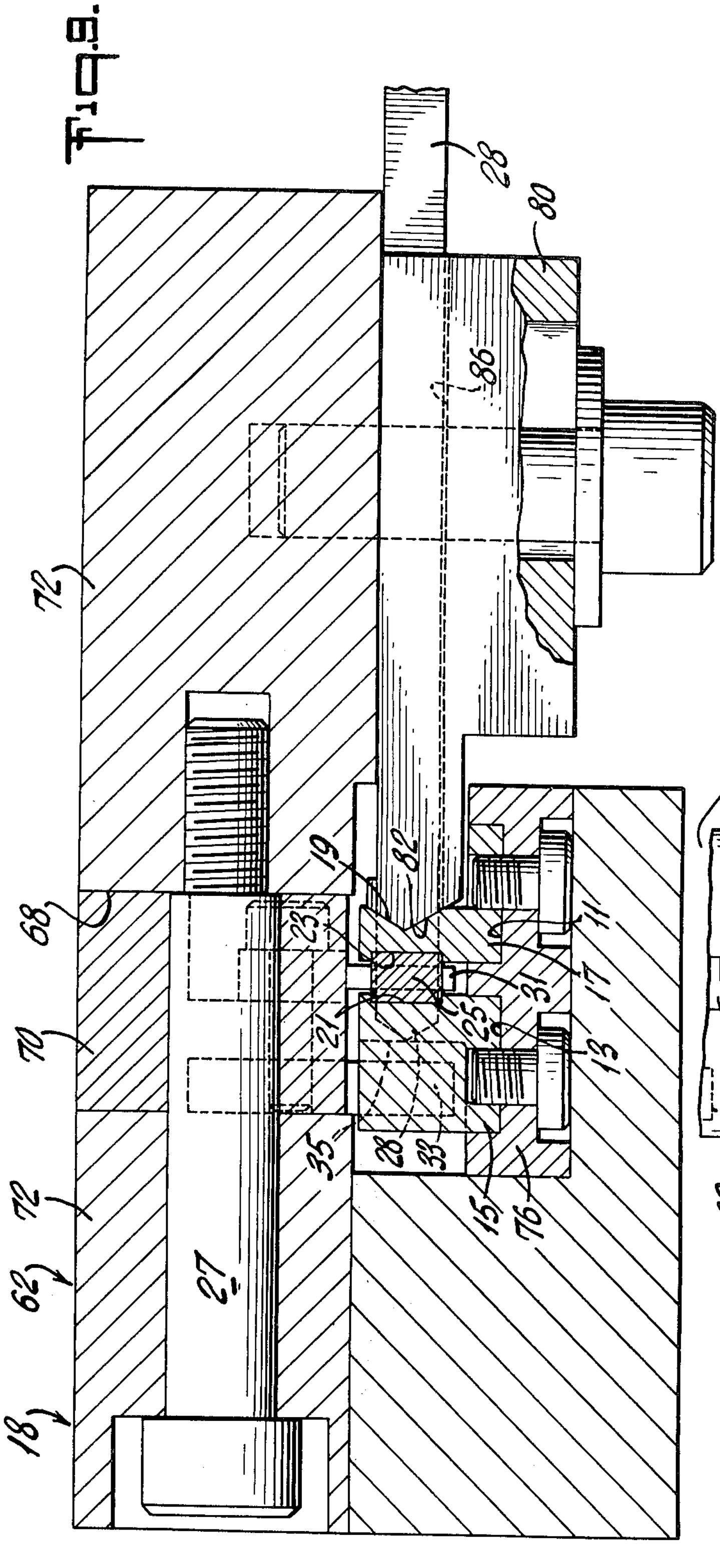
FIG. 9 is an enlarged plan section along the lines 9—9 of FIG. 6A.
Figure 10:
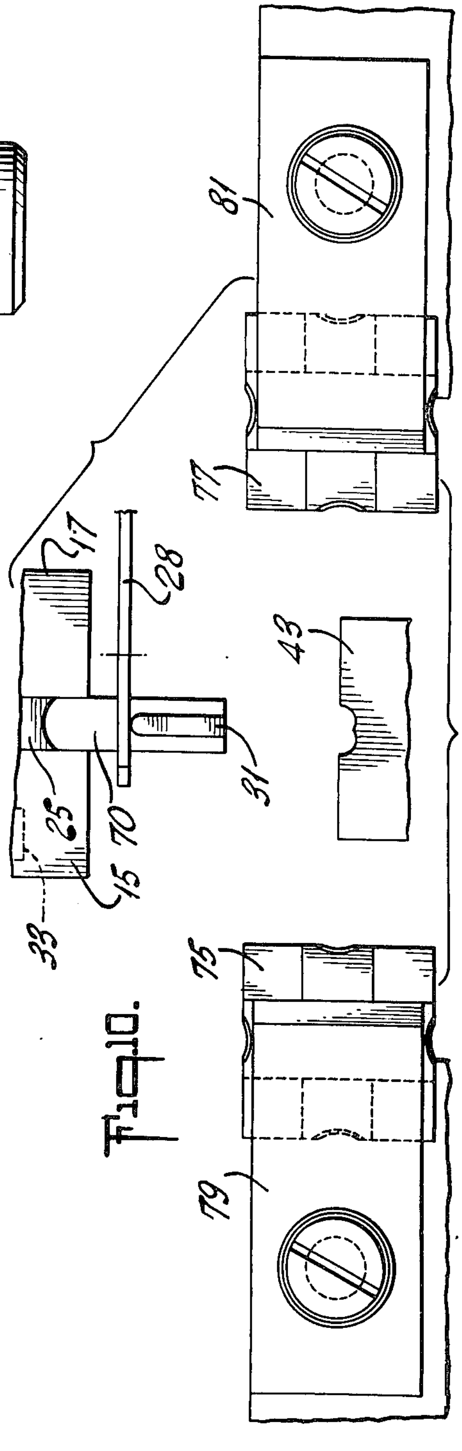
FIG. 10 is a fragmentary enlarged portion of the operating station of FIG. 1.

Turning now to FIGS. 6 through 8, upper assembly 18 includes a housing casting 62 fixed relative to the stationary frame 10. Housing 62 comprises an upper cavity 64 housing an eccentric drive assembly 66 and a lower guide slot 68 housing an anvil assembly 70 further described below. Housing 62 also includes an elongated right block 72 that coöperates with the housing front cover 74 to form a vertical slide way for the guide carrier assembly 76 and the ram assembly 78. A cutting block 80 is mounted to housing 62 contiguous to the bottom of the slide way and is provided with a cutting guide portion 82 that extends into the path of the bottom of the slide way. Bloock 80 is further provided with a stock feed channel 84 better seen in FIGS. 6A and 7A which channel communicates with channel 34 of FIG. 2 to receive the stock ribbon 28 and which channel 84 feeds the stock through its outlet port 86 across the plane of the slide way.

Figure 6A:
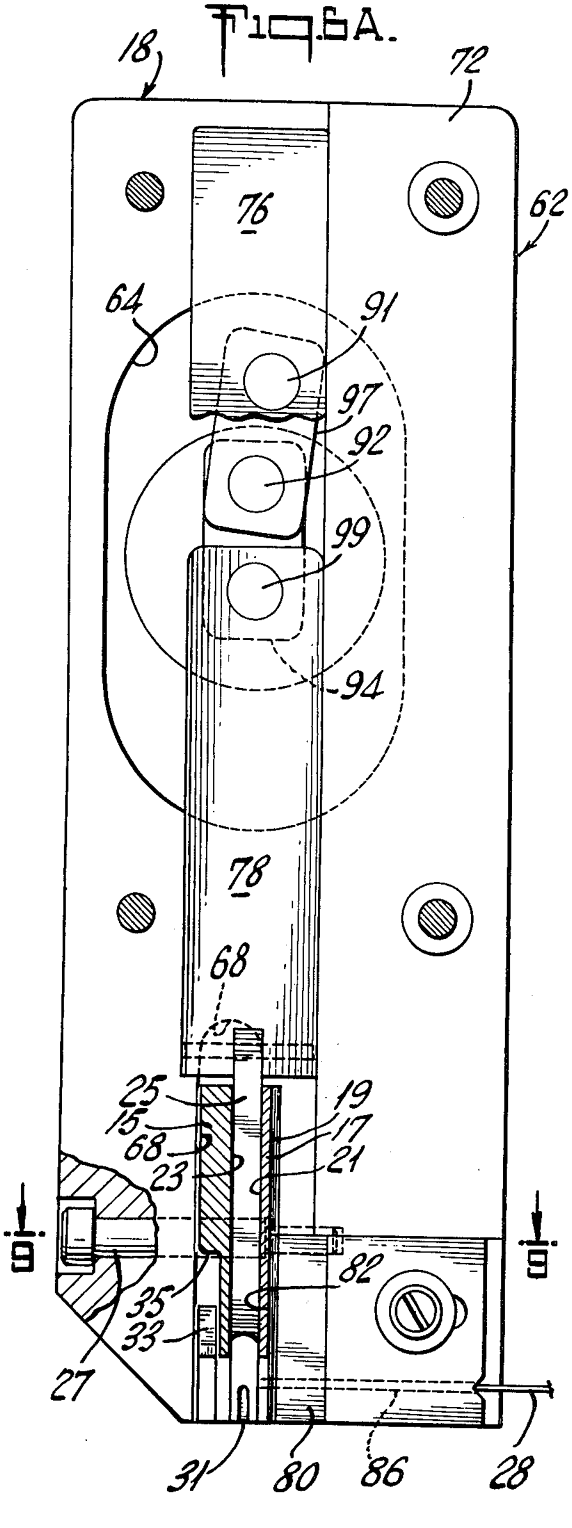
FIG. 6A is a front sectional view of FIG. 6 taken along the broken line *6a—6a* of FIG. 6.

The eccentric assembly 66 is driven by shaft 88 which is coupled to the mechanical drive and gear box assembly 20 and which shaft 88 upon actuation rotates clock-wise in FIGS. 6A and 7A through about 180 degrees and then rotates counterclockwise to its first position. Assembly 66 includes a drive wheel 90 mounted coaxially with shaft 88 and a drive pin 92 offset from the axis of wheel 90 and offset above the same a pre-determined distance along the axis of the slide way. Ram assembly 78 is held in the slide way for vertical reciprocation and is driven by the ram drive link 94 having a top opening 96 seating drive pin 92 and a bottom hole 98 seating pin 99 fixed to the ram assembly 78. Guide carrier 78 is also held for vertical reciprocation within the slide way by cover 74 and housing 62. Guide carrier 76 is driven by the guide carrier link 97 having a bottom hole 95 receiving pin 92 and a top hole 93 receiving pin 91 which is secured to carrier 76.

The bottom of carrier 76 forms a pair of mounting channels 11 and 13 which receive and have secured therein left and right guides 15 and 17 respectively. Right guide 17 includes an elongated vertical channel 19 having a profile complimentary to the profile of extending portion 82 of cutting block 80, such that the bottom face of guide 17 acts as a cutting surface in cooperation with the bottom surface of port 86 of cutting block 80. Guides 15 and 17 are further provided with inward facing channels 21 and 23 serving to receive ram 25 of assembly 28.

As better seen in FIGS. 6 and 7 anvil assembly 70 is mounted for rotation on pin 27 and is spring biased by spring 29 against stop 31 of housing 62. In this position (FIG. 6) anvil 31 extends into the slide way in alignment with the bottom face of ram 25. Assembly 70 further comprises a flipper or cam surface 33 that extends into the slide way in alignment with the bottom face of ram 25. Assembly 70 further comprises a flipper or cam surface 33 that extends into the longitudinal plane of left guide 15. Guide 15 is provided with shoulder 35 that engages flipper 33 upon the downward movement of assembly 76 so as to force assembly 70 clockwise against spring 29 thereby withdrawing anvil 31 from the plane of the slide way, better seen in FIG. 7.

In operation, stock is fed through channel 84 until a pre-determined length protrudes from port 86 across and just above anvil 31. This stock may be in the ready position as a result of the last step of the operation from the previous actuation of the equipment. Upon actuation of assembly 18, drive 90 begins to rotate from its position shown in FIG. 6 so as to drive the ram and guide carrier assemblies through links 94 and 97 respectively. By reason of the respective angular starting positions of these links and their relation to pin 92 and the axis of drive 88, guide carrier 76 has a greater initial downward travel per degree of rotation of disc 90 than does ram assembly 78. On the other hand, as shaft 88 nears its 180 degrees half-cycle, ram assembly 78 has a greater downward movement than guide carrier 76 per degree of rotation of drive wheel 90. Accordingly, the action between FIGS. 6A and 7A is that guides 15 and 17 first lower to sever the end of ribbon 28 that extends within the slide way and continue downward to force the ends of the cut ribbon downward about either side of anvil 31 before any appreciable downward movement is made by ram 25. As assembly 76 continues its downward movement shoulder 35 engages flipper 33 to drive anvil 31 out of the plane of the slide way leaving the U-shaped terminal segment secure between left and right guides 15 and 17. After the segment has been forced into the die about the leads in a manner further described below, assemblies 76 and 78 begin to withdraw up the slide way by reason of the reverse rotation of shaft 88 and continue until all parts return to their zero or ready positions depicted in FIG. 6.

The bottom assembly 16 (FIGS. 11, 12, and 13) comprises a terminal forming die assembly 41 mounted for vertical reciprocation on frame 10 and positioned in vertical alignment with ram 25. The die assembly 41 includes a die plate 43 having an upstanding cavity and said die plate is removably mounted to a die plate carrier 45 further described below. A cutter blade 47 is removably carried on cutter carrier 49 mounted for independent vertical reciprocation behind die plate carrier 45. A pair of guide blocks 51 and 53 are provided in fixed relation to frame 10 to act as a slide way for the carriers 45 and 49. In the event it is intended to join leads entering from the front and rear of die plate 43, cutter 47 is merely removed so that no cutting takes place upon upward movement of cutter carrier 49. Lead guide plate 111 is fixed to frame 10 and serves to close the front face of carrier 45 to retain pin 61 and also has an upper portion provided with a V-shaped notch 113 in alignment with the die cavity. Notch 113 indicates to the operator where to place the leads and serves to support the leads for proper alignment relative to die cavity 43.

Figures 11, 12, 13:
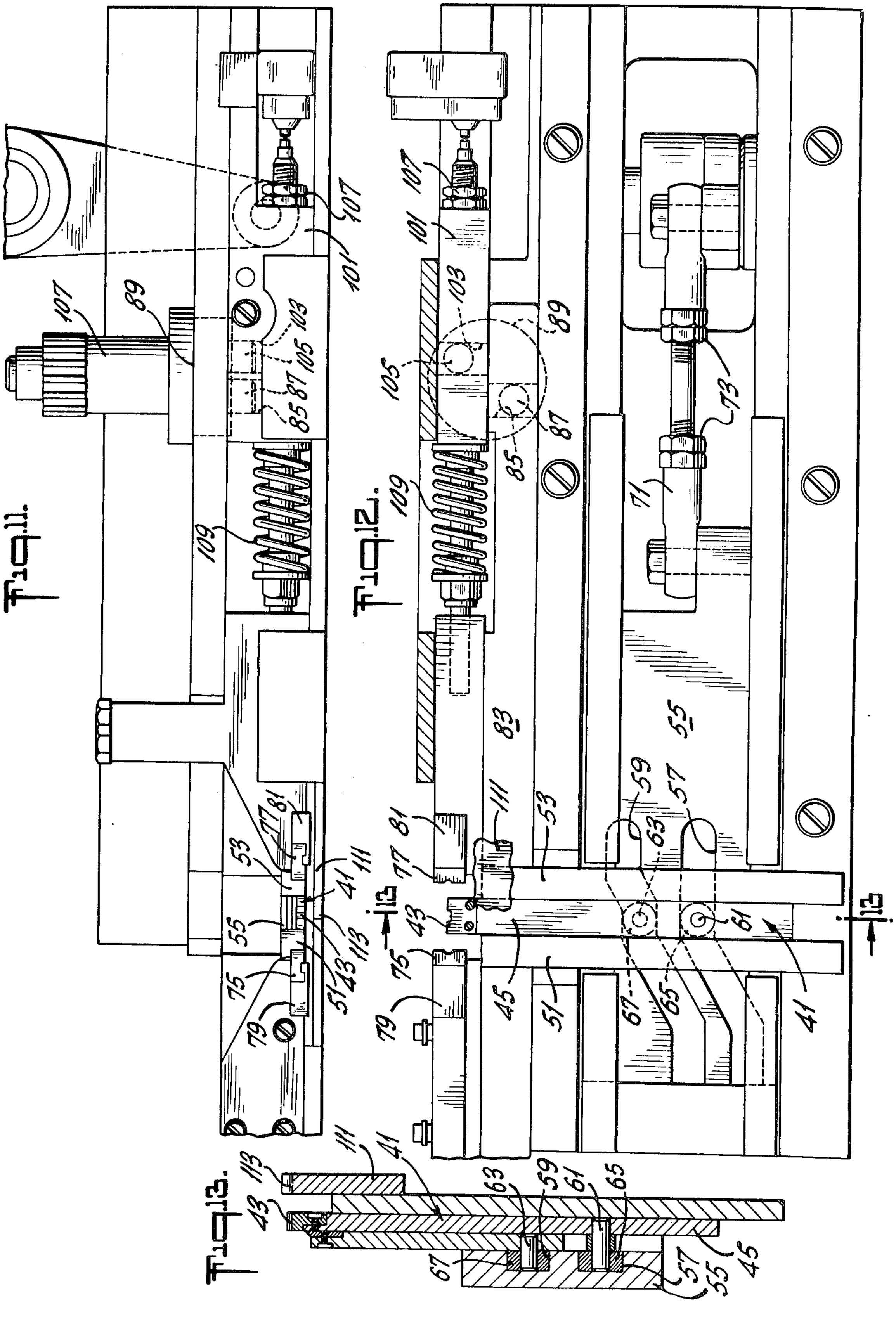
FIG. 11 is a plan section taken along line 11—11 of FIG. 1.
FIG. 12 is a front elevation view of FIG. 11.
FIG. 13 is a transverse section view taken along line 13—13 of FIG. 12.

As better seen in FIG. 12 a cam plate 55 mounted for horizontal reciprocation is provided with die cam slot 57 and cutter cam slot 59. Carriers 45 and 49 are supported by pins 61 and 63 respectively which in turn are held in rollers 65 and 67 respectively riding in cam slots 57 and 59 respectively. In the zero or staple forming position, cam plate 55 has the position as shown in FIG. 12 which positions die carrier 45 in its operating (staple forming) position. Upon leftward displacement of plate 55, roller 67 is displaced upward by cam slot 59; however, roller 65 remains at the same level by reason of the horizontal configuration of slot 57. This leftward movement of plate 55 is sequenced with ram 25 coming to its lowermost position. Accordingly, cutter blade 47 moves upward to sever the exposed lead ends in cooperation with the back face of ram 25 acting as a cutting surface. Thereafter, plate 55 is withdrawn to the right, thus lowering carrier 49 to the position shown in FIG. 12. However, plate 55 continues to the right so that carriers 45 and 49 are lowered under the control of cam slots 57 and 59. In this way, die plate 43 and cutter 47 are withdrawn (lowered) from the forming and fusing station as ram 25 and guides 15 and 17 are withdrawn in the upward direction, as described below.

Movement of plate 55 is controlled and actuated by rocker arm 69 driven by the drive and gearing arrangement 20 by way of any suitable mechanical coupling to arm 69. Arm 69 is in turn coupled to plate 55 by linkage 71, the length of which is adjusted by adjusting nuts 73.

A pair of electrodes 75 and 77, initially positioned spaced from and on either side of the staple forming station, are removably mounted to respective left and right electrode slide carriers mounted for horizontal reciprocation on frame 10. Each electrode has four electrode surfaces, one on each side of its square configuration. Upon damage or wear of an electrode surface, a new surface is available simply by rotating the electrode 90 degrees. Each electrode is made of any suitable material. If the ribbon 28 is of low resistant material (such as copper), the electrodes should be of high resistance, and if the ribbon is of high resistant material, the electrodes should be of low resistant material. For purposes of the present example, a high resistant electrode will be assumed. Horizontal movement of slide 79 is controlled by slide block 83 coupled to slide 79 and having a slot 85 receiving pin 87 of an eccentric drive wheel 89. Slide 81 is coupled to a rear slide block 101 having slot 103 receiving a second pin 105 of the eccentric drive 89. Also coupled to slide block 101 is coupled to slide block 101 is contact switch S which controls application of fusing current. Electrode pressing force during the fusion step in controlled by adjustment of the nuts 107 to adjust the initial spring bias on the connecting link 109. Fixedly coupled to slide block 101 is contact Switch S that controls application of fusing current. Eccentric drive 89 is actuated by drive shaft 107 coupled to the drive gearing arrangement 20 by any suitable means (not shown). Upon actuation, eccentric drive 89 is first rotated in the counter-clockwise direction (FIG. 12) to drive electrodes 75 and 77 together to pressure the staple and leads together in the manner described below. After a predetermined pressure is built up on link spring 101, switch S closes upon contact with the through rod K. At the appropriate time interval fusing current is applied to the electrodes under control of the timing and control circuits 24. Upon completion of the fusion step, drive 89 rotates clockwise to withdraw electrodes 75 and 77 to the position shown in FIG. 12.

Figure 14:
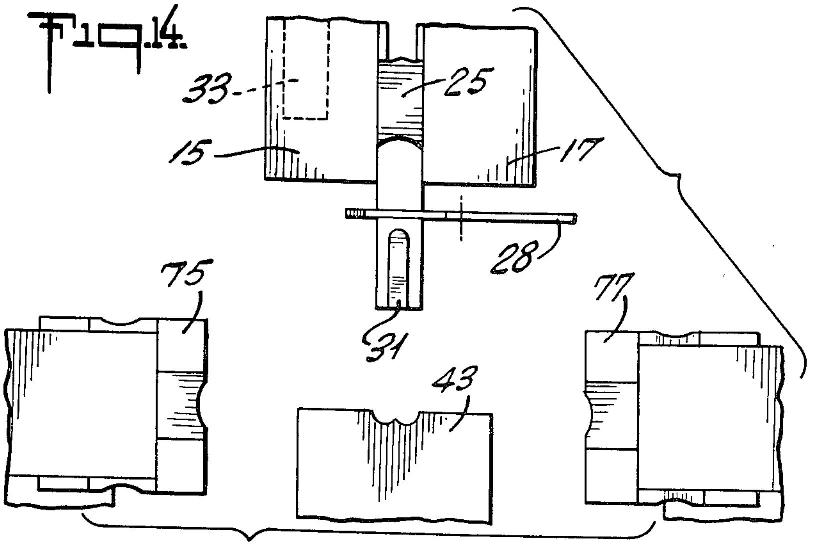
FIGS. 14 through 20 are diagrammatic views showing the steps of operation of the embodiment of FIGS. 1 through 13 and certain steps of the method of the invention.
Figure 15:
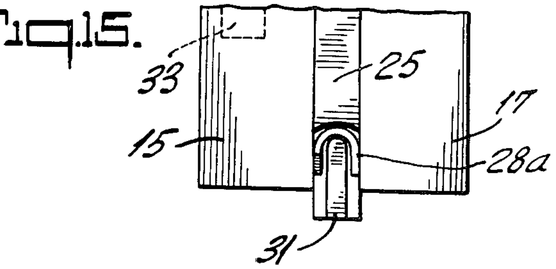
Figure 16:
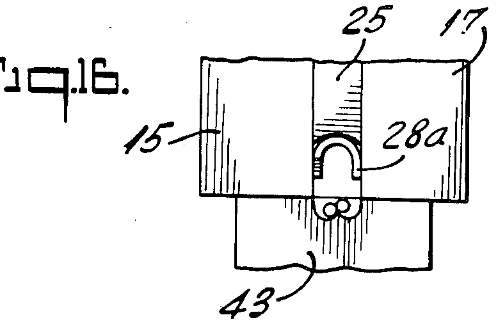
Figure 18:
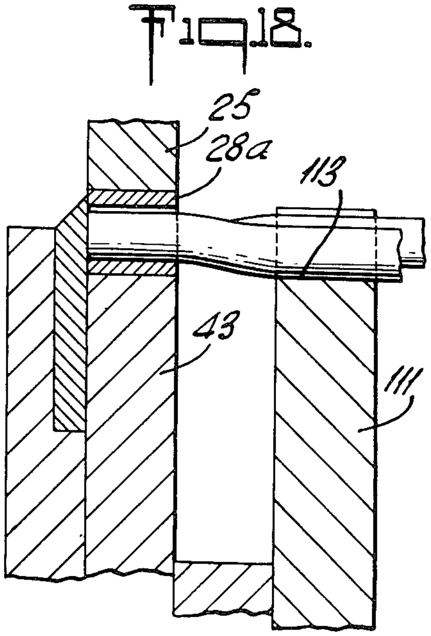
Figure 17:
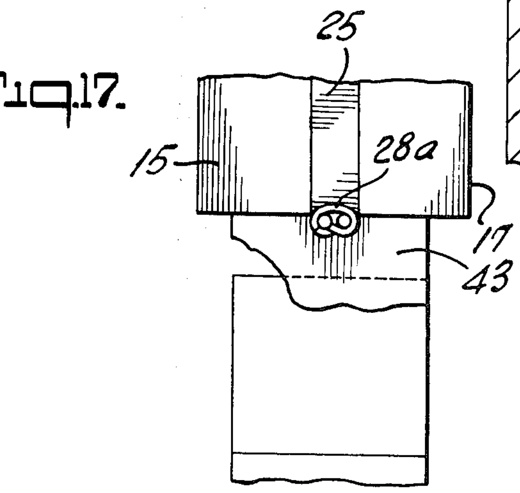
Figure 19:
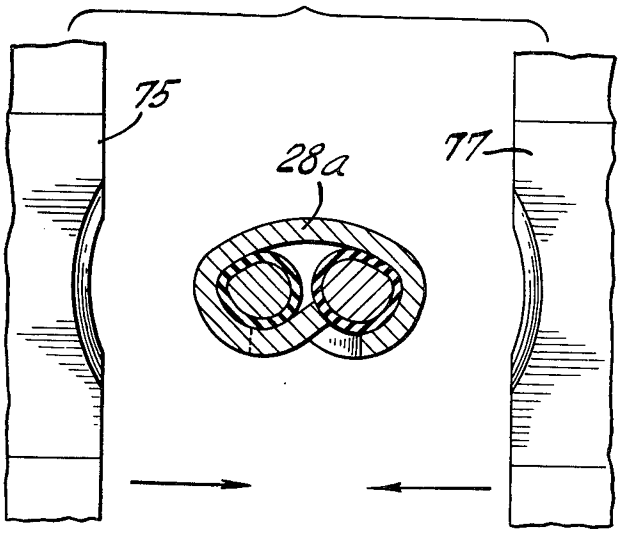
Figure 20:
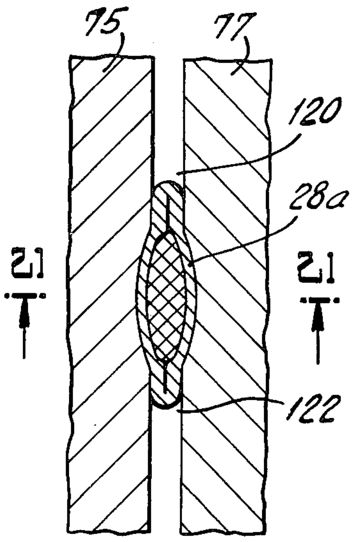

With reference to FIG. 10 and FIGS. 14 through 21 prior to actuation the respective parts have the position shown in FIG. 14 but upon actuation left and right guides 15 and 17 lower to sever the forward exposed end of stock 28 and continue downward to press the severed portion 28*a* into staple-shape about anvil 31, better seen in FIG. 15. With reference to FIGS. 15 and 16, ram 25 follows in behind the movement of guides 15 and 17 as the assembly lowers. As movement continues, the shoulder on guide 17 engages flipper 33 to withdraw anvil 31 from the slide way. The ram and guide assembly continues downward until guides 15 and 17 nearly abut the top surfaces of die plate 43 with a separation, for example, of 0.002 inches. However, ram 25 continues its relative movement downward driving the free ends of staple 28*a* into engagement with the curved side and bottom portions of the die cavity. At this time outward movement of the side portions of terminal 28*a* is confined by guides 15 and 17. Ram 25 continues until the position shown in FIG. 17 is reached at which terminal 28*a* has been closed and pressed about the lead wires generally as shown. It should be understood that the terminal and wire assembly at this point has no practical value as a final termination.

If trimming is desired, cutter moves up the back face of die plate 43 and serves the wire against the back face of ram 25. See FIG. 18.

Thereafter, ram 25 and guides 15 and 17 withdraw upward and die plate 43 and cutter carrier withdraw downward leaving the terminal and leads free to receive the electrodes. Note that the general profile of the terminal and lead configuration is elongated in the horizontal plane (FIG. 19) prior to the fusion step. As electrodes 75 and 77 come together about the terminal, the application of fusing current and heat burns off insulation to at least the extent necessary for a good electrical connection and heats the terminal and lead wires to their plastic state. As fusion begins, the ridges of staple 28*a* serve to concentrate heat as current passes through the terminal 28*a*. The heat concentration is applied by the ridges to the insulation to enhance burning the same to expose the ridge to the metallic wire. As pressure is applied, the ridges engage the wire to heat and conduct current internally to the wire. Another function of the ridges is that during the fusion step they are driven into the soft surface of the wire when the latter is in its plastic state. Upon cooling and hardening of the wire and staple, the ridges enhance the mechanical integrity of the termination by assisting all the fused surfaces in resisting a longitudinal displacement between the terminal and the wire.

During fusion, application of electrode pressure squeezes the terminal and leads in the direction along its formerly elongated profile so as to recompress the internal leads and terminal along a new pressure direction. Pressure and heat continue causing the terminal to take an elongated vertical profile, better seen in FIG. 20. To obtain the greatest efficiency upon application of pressure, spaces are provided between the electrodes to permit formation of a minor amount of flash generally indicated at 120 and 122. Also, the contacting surfaces of the electrodes are arcuate to direct the forces toward a common center zone.

Figure 21:
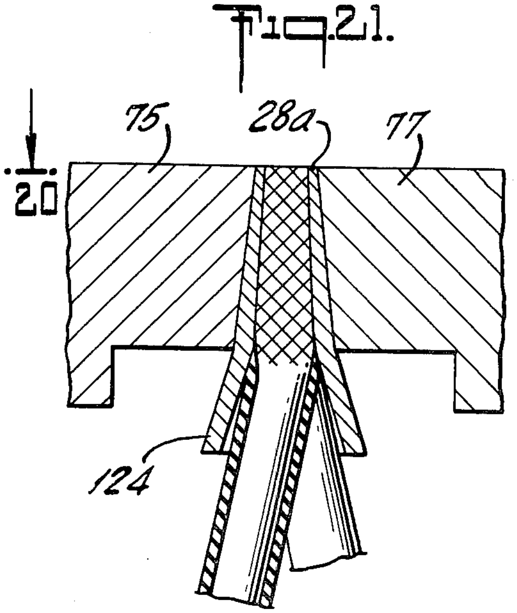
FIG. 21 is a plan section along line 21—21 of FIG. 20.

As better seen in FIG. 21 the thickness (e.g. 0.09 inches) of the electrode that makes contact with the terminal is less than the thickness of the terminal. Furthermore, the electrodes engage the terminal at the free ends of the enclosed leads thus permitting the other end of the terminal to flare as at 124. This is desirable inasmuch as the flare 124 permits spreading of the leads for extension in different directions without having the terminal edge cut or tear the lead insulation or surface.

During the fusion step automatic testing circuits within the control circuit 24 automatically conduct a test by sensing secondary current. This test may indicate the nature or equality of the material being fused, the time for application of peak current and the change in electrode quality so that if the properties of secondary current fall below prescribed limits, an alarm sounds to indicate that corrective maintenance or steps should be taken.

Figure 22:
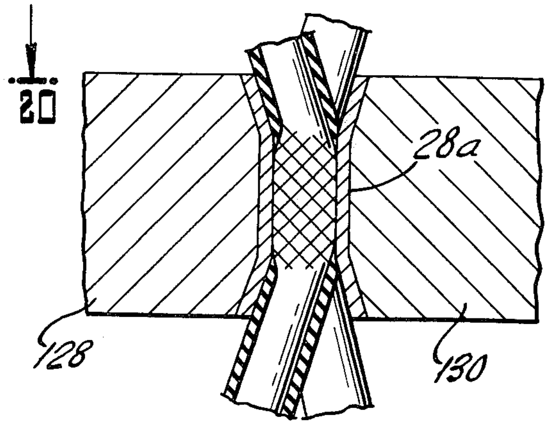
FIG. 22 is a view similar to FIG. 21 of a modification of the present invention capable of joining ends of two leads fed from the front and back of the fusing station.

In the event an opposed connection of wires is to be made, electrodes 77 and 75 are replaced by electrodes 128 and 130 of FIG. 22. These electrodes are shaped to contact the terminal 28*a* in the central region so as to fuse the enclosed wires and terminal 28*a* thereat. This causes terminal 28*a* to flare at its forward and rear ends generally as shown. As described above, cutter 47 is removed when this type of connection is made. Note also that the alignment and movement of parts in upper assembly 18 and lower assembly is in a common (vertical) plane facilitating operator access on both sides of this plane for wire insertion.

It is apparent that the method and apparatus according to the present invention affords great benefit in making wire insulated and uninsulated terminations and can accomodate aluminum, steel copper alloys, or any other material of wire, in any size or combination of sizes, (e.g. from No. 45 through 150 thousandths or larger diameter) desired to be joined. It is also apparent that various modifications can be made to the herein disclosed examples of the present invention without departing from the spirit and scope thereof. Any configuration of terminal can be accomodated by proper selection of the contacting electrode surface.

What is claimed is:

1. A method of electrically connecting two or more wires comprising forming a terminal about the wires elongating the terminal and wire in one direction, applying heat and current to the terminal and wires causing softening of the same, applying pressure to the softened terminal and wires fusing the contacting surfaces thereof and elongating a portion of the terminal and wire in a direction generally perpendicular to said one direction.

2. A method according to claim 1 wherein the step of applying heat includes applying the heat and current to the wires in a predetermined concentrated zone.

3. A method according to claim 1 wherein the step of applying pressure includes applying pressure to less than the full length of the terminal causing at least one end of the terminal through which one of the wires extends to be flared.

4. A method according to claim 1 wherein the step of applying pressure includes applying pressure to less than the full circumference of the terminal permitting a flash of terminal material to form.

5. A termination made by the method of claim 4.

6. A termination connecting two or more wires made by the method of claim 1.

* * * * *